(12) United States Patent
Krstajic et al.

(10) Patent No.: US 8,696,877 B2
(45) Date of Patent: Apr. 15, 2014

(54) ELECTRODE SUITABLE AS HYDROGEN-EVOLVING CATHODE

(75) Inventors: Nedeljko Krstajic, Belgrade (RS); Vladimir Jovic, Belgrade (RS); Antonio Lorenzo Antozzi, Merate (IT)

(73) Assignee: Industrie de Nora S.p.A., Milan (IT)

( * ) Notice: Subject to any disclaimer, the term of this patent is extended or adjusted under 35 U.S.C. 154(b) by 65 days.

(21) Appl. No.: 13/151,520

(22) Filed: Jun. 2, 2011

(65) Prior Publication Data

US 2011/0226627 A1 Sep. 22, 2011

Related U.S. Application Data

(63) Continuation of application No. PCT/EP2009/066111, filed on Dec. 1, 2009.

(30) Foreign Application Priority Data

Dec. 2, 2008 (IT) .............................. MI2008A2130

(51) Int. Cl.
| C25B 11/06 | (2006.01) |
| C25B 11/04 | (2006.01) |
| C25D 3/12  | (2006.01) |
| C25B 9/16  | (2006.01) |

(52) U.S. Cl.
USPC ...... 204/293; 204/290.13; 204/291; 204/292; 205/109; 205/255

(58) Field of Classification Search
USPC .......... 204/280, 290.01, 290.12, 290.13, 291, 204/292, 293; 205/149, 152, 205, 216, 217, 205/218, 238, 255, 333, 109
See application file for complete search history.

(56) References Cited

U.S. PATENT DOCUMENTS

| 2,351,639 | A | * | 6/1944  | Schweikher ................. 205/333 |
| 4,323,595 | A |   | 4/1982  | Welch et al. |
| 4,354,915 | A | * | 10/1982 | Stachurski et al. ........... 204/242 |
| 4,414,064 | A | * | 11/1983 | Stachurski et al. ........... 205/227 |
| 4,421,626 | A | * | 12/1983 | Stachurski et al. ...... 204/290.03 |
| 4,422,920 | A | * | 12/1983 | Stachurski et al. ...... 204/290.01 |
| 4,470,890 | A | * | 9/1984  | Bommaraju et al. ......... 205/350 |
| 4,568,433 | A | * | 2/1986  | Samejima et al. ............ 205/537 |
| 4,657,653 | A | * | 4/1987  | Bouet ...................... 204/290.13 |
| 4,938,851 | A |   | 7/1990  | Nidola |
| 5,948,223 | A | * | 9/1999  | Horikoshi et al. ......... 204/290.1 |

FOREIGN PATENT DOCUMENTS

JP          56022636 A       3/1981

OTHER PUBLICATIONS

"Intermediate Molybdenum Oxides Involved in Binary and Ternary Induced Electrodeposition" by Gomez et al., J. Electroanal. Chem. 580, pp. 238-244 (2005).*
"Morphology and Phase Composition of As-Deposited and Recrystallized Ni—Mo—O Powders" by Lacnjevac et al., Electrochim. Acta 54, pp. 3115-3123 (2009).*
"Study of the Hydrogen Evolution Reaction on Nickel-Based Composite Coatings Containing Molybdenum Powder" by Kubisztal et al., 32, pp. 1211-1218 (2007).*
International Search Report Dated Jun. 2, 2010 for PCT Application No. PCT/EP2009/066111, 4 Pages.
Xie, Zhihua, et al. "Preparation and Characterization of a new type of active cathode material." 1 Page.

* cited by examiner

*Primary Examiner* — Bryan D. Ripa
(74) *Attorney, Agent, or Firm* — Lucas & Mercanti, LLP

(57) ABSTRACT

The invention relates to a cathode for hydrogen evolution in electrolysis cells, for instance chlor-alkali cells or cells for producing chlorate or hypochlorite, obtained starting from a substrate of nickel or other conductive material galvanically coated with nickel co-deposited with an amorphous molybdenum oxide.

11 Claims, No Drawings

US 8,696,877 B2

ELECTRODE SUITABLE AS HYDROGEN-EVOLVING CATHODE

CROSS-REFERENCE TO RELATED APPLICATION

This application is a continuation of PCT/EP2009/066111 filed Dec. 1, 2009, that claims the benefit of the priority date of Italian Patent Application No. MI2008A002130 filed Dec. 2, 2008, the contents of which are herein incorporated by reference in their entirety.

FIELD OF THE INVENTION

The invention relates to an electrode useful as a hydrogen-evolving cathode in electrolysis cells.

BACKGROUND OF THE INVENTION

The invention relates to an electrode for electrolysis processes, in particular to a cathode suitable for hydrogen evolution in an industrial electrolysis process. The electrolysis of alkali brines for the simultaneous production of chlorine and alkali and the processes of electrochemical production of hypochlorites and chlorates are the most typical examples of industrial electrolytic applications with hydrogen cathodic evolution, but the electrode is not limited to any particular use.

In the electrolysis process industry, competitiveness depends on several factors, the most important of which is the reduction of energy consumption, directly associated with the operating voltage. This justifies the many efforts aimed at reducing the various components of the latter, among which cathodic overvoltage must be counted. Even though cathodic overvoltages naturally obtainable with electrodes of chemically resistant materials (for instance carbon steel or nickel) not provided with catalytic activity have been considered acceptable in several industrial applications, the energy cost increase has by now made necessary the use of catalytic systems to facilitate cathodic hydrogen evolution. A solution practised in the art to depress cathodic hydrogen evolution overvoltage in electrolytic processes is given by the use of nickel substrates provided with catalytic coatings based on noble metals, such as platinum or ruthenium. This implies, however, a sensible cost increase due to the high price of noble metals. Some catalytic systems based on materials alternative to noble metals were thus implemented, among which various nickel alloys with other metals such as molybdenum, manganese, titanium, tungsten, vanadium, indium, chromium and zinc, obtained by galvanic co-deposition or by thermal processes, such as flame or plasma thermal spraying. Of all these systems, nickel-molybdenum galvanic alloys have given the best results, their catalytic activity being nevertheless still far from that obtainable by means of noble metal-based coatings. The cited alloys do not show, in fact, any true synergistic effect, and their increased activity towards hydrogen evolution reaction is due to a purely geometric effect, as demonstrated by the fact that the Tafel slope they exhibit is equivalent to that relevant to pure nickel (−120 mV per current decade).

The metal alloys of nickel and molybdenum also present the drawback of an insufficient open circuit stability in alkaline environment, which accounts for the unsuitable duration of the corresponding cathodes used in chlor-alkali processes or in water chlorination by hypochlorite generation. The problem is further enhanced in cases where such electrodes are subjected to anodic polarisation, be it accidental (for instance for a malfunctioning of the relevant electrolyser) or programmed (such as the case of chlorinating cells, wherein the potential inversion is used for the periodic cleaning of electrodes from scaling deposits).

It is, therefore, necessary to identify a noble metal-free catalytic formulation for an electrode suitable for operating as a hydrogen-evolving cathode in industrial electrolysis cells presenting characteristics of improved hydrogen evolution cathodic potential and of higher stability in alkaline environments, optionally also at open circuit or under anodic polarisation.

SUMMARY OF THE INVENTION

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter. As provided herein, the invention comprises, under one aspect an electrode suitable for use as cathode for hydrogen evolution in electrolytic processes comprising a conductive substrate provided with a superficial coating based on nickel co-deposited with at least one amorphous molybdenum oxide.

In another aspect the invention comprises a method of manufacturing of an electrode suitable for use as a cathode for hydrogen evolution in electrolytic processes comprising the following simultaneous or sequential steps, addition of particles of a species selected between $MoO_3$, $NiMoO_4$ and $H_xMoO_3$ with x comprised between 0 and 1 to a galvanic bath containing nickel ions and galvanic co-deposition of nickel with at least one amorphous molybdenum oxide on a cathode substrate immersed in said galvanic bath at a current density of 20 to 100 $mA/cm^2$.

To the accomplishment of the foregoing and related ends, the following description sets forth certain illustrative aspects and implementations. These are indicative of but a few of the various ways in which one or more aspects may be employed. Other aspects, advantages, and novel features of the disclosure will become apparent from the following detailed description.

DESCRIPTION

Several aspects of the invention are set forth in the appended claims.

In one embodiment, the invention relates to an electrode comprising a conductive substrate, optionally of nickel or copper, provided with a superficial coating based on nickel co-deposited with at least one amorphous molybdenum oxide.

The inventors have, in fact, observed that the nickel-molybdenum catalytic systems present a catalytic activity and a stability to the alkaline environment comparable to the one of noble metals when molybdenum is present, not as a metallic phase, but in an amorphous oxide phase, for instance obtainable by galvanic co-deposition of nickel with preformed $MoO_3$ particles. In one embodiment, the galvanic co-deposition process is carried out on a galvanic bath containing nickel ions, for example a Watt bath containing preformed $MoO_3$ particles at a controlled current density, comprised between 20 and 100 $mA/cm^2$. This has the advantage of favouring the deposition of $MoO_3$ in a partially reduced amorphous form (with formation of non-stoichiometric oxides expressed by the formula $H_xMoO_3$ with x comprised between 0 and 1) and/or in form of nickel and molybdenum mixed oxide ($NiMoO_4$).

In one embodiment, the galvanic co-deposition is carried out with preformed particles of $NiMoO_4$ or of partially reduced molybdenum oxide expressed by the formula $H_xMoO_3$ with x comprised between 0 and 1 dispersed in the nickel-ion containing galvanic bath.

The inventors observed that the indicated species present a Tafel slope related to hydrogen evolution reaction at low current density around 30-40 mV per current decade, which is an unmistakable indication of the fact that the reaction mechanism is changed with respect to the characteristic one of nickel electrodes by virtue of a synergistic effect, with the Heyrovsky and Tafel partial reactions that assume an equal importance in the determination of the overall mechanism. In one embodiment, the amorphous molybdenum oxides co-deposited with the metallic nickel onto the cathode substrate have a particle size not exceeding 50 nm, for instance, in one embodiment, comprised between 10 and 50 nm.

This feature can have the advantage of increasing the number of active catalytic sites per unit surface. The particle size of the amorphous oxide can be controlled by acting on the deposition current density but also on the size of the oxide particles suspended in the galvanic bath. In one embodiment, $MoO_3$ particles of submicronic size, suitable for the co-deposition of amorphous molybdenum oxides of the indicated particle size into a nickel metal phase, are obtained by thermal decomposition of a precursor salt, for instance an ammonium molybdate. In one embodiment, the Ni:Mo molar ratio referred to the elements in the electrode superficial coating comprises between 4 and 10. This can have the advantage of producing a sensibly more active coating than the one obtainable with a lower amount of molybdenum, and at the same time a more stable one from a mechanical adhesion standpoint than that obtainable with a higher amount of molybdenum.

The invention will be better understood by aid of the following examples, which shall not be intended as a limitation of the scope thereof.

EXAMPLE 1

A series of electrodes was prepared by simultaneous deposition of Ni and Mo amorphous oxide starting from a Watt bath with the following composition: $NiSO_4.6H_2O$, 330 g/l; $NiCl.6H_2O$, 45 g/l; $H_3BO_3$, 38 g/l; pH=2, containing suspended submicronic $MoO_3$ particles. The $MoO_3$ powder utilised was prepared by thermal decomposition of $(NH_4)_6Mo_7O_{24}.4H_2O$ at 500° C. for 2 hours in air atmosphere and dispersed into the bath by magnetic stirring at 2500 rpm. The $MoO_3$ content in the bath was varied up to a maximum concentration of 20 g/l, in order to obtain co-depositions at a Ni:Mo molar ratio comprised between 4 and 10. The electrode substrates employed consisted of nickel plates of 10 mm×10 mm×0.2 mm size, etched in HCl. The coating deposition was carried out under galvanostatic control, maintaining the bath under stirring at 40° C., with a constant electric charge transfer of 72 C/cm². The deposition current density was varied, for the different samples, from 10 to 100 mA/cm². The thus obtained electrodes were characterised by micrography and X-Ray diffractometry. Such testing evidenced the formation of molybdenum oxide-pigmented nickel deposits, the more compact and less fractured, the higher the deposition current density. The XRD spectrum showed in every case the disappearance of the characteristic peak (2θ=48° attributable to $MoO_3$, well visible on the powder prepared by thermal decomposition. This is an indication that molybdenum oxide embedded in the nickel deposit underwent a phase transition, totally losing its crystallinity. A subsequent EDS analysis further showed the formation of non-stoichiometric oxides expressed by the formula $H_xMoO_3$ with x comprised between 0 and 1, such as $H_{0.93}MoO_3$ and $H_{0.34}MoO_3$, deriving from a partial reduction of molybdenum oxide according to the reaction:

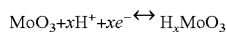

$$MoO_3 + xH^+ + xe^- \leftrightarrow H_xMoO_3$$

Finally, the presence of mixed oxide $NiMoO_4$, formed as well during the deposition, was also observed. The particle size of the deposited molybdenum oxides turned out to be generally comprised between 10 and 50 nm for the various samples. The above described samples were numbered from 1 to 18.

As a comparison, an electrode according to the prior art based on a nickel-molybdenum alloy on a nickel substrate was prepared. The electrode substrate employed consisted of a nickel plate equivalent to those used for the production of the previous samples. The alloy was galvanically deposited starting from a bath having the following composition: $Na_2MoO_4.2H_2O$, 0.02 M; $NiCl_2.6H_2O$, 0.04M; $Na_2P_2O_7.10H_2O$, 0.130M; $NaHCO_3$, 0.893 M; $ZnCl_2$, $3\times10^{-4}$ M; hydrazine sulphate, 0.0254M; $CdNO_3.4H_2O$, $3\times10^{-4}$M; KSCN, $5.8\times10^{-4}$M; pH=7.8. The deposition was carried out at 15 mA/cm² for 5 minutes, subsequently incremented to 70 mA/cm² for a further 30 minutes, maintaining the bath temperature below 20° C. by thermal exchange with a water and ice bath.

The above described reference sample was identified as 0.

The obtained electrodes were characterised as hydrogen-evolving cathodes in a standard electrochemical cell with a 1 M NaOH-based catholyte at a temperature of 25° C. The electrode potentials, from which the relevant overvoltages η were calculated, were measured making use of a saturated calomel electrode (SCE) as reference. The results reported in Table 1 were obtained, wherein J indicates the current density of deposition of the nickel-amorphous molybdenum oxide coating, Ni:Mo indicates the nickel to molybdenum oxide ratio in the deposit referred to the elements, $b_1$ (V/current decade) indicates the first Tafel slope at low current density (indicatively for log j<2 with j expressed in A/cm²), $b_2$ (V/current decade) indicates the second Tafel slope at higher current density, η (V) indicates hydrogen overvoltage at a current density of 0.1 A/cm².

TABLE 1

| Sample ID | J (mA/cm²) | Ni:Mo | b1 (V/dec) | b2 (V/dec) | η (V) |
|---|---|---|---|---|---|
| 0 | — | — | −0.124 | — | 0.264 |
| 1 | 10 | 4 | −0.042 | −0.172 | 0.250 |
| 2 | 30 | 4 | −0.043 | −0.123 | 0.160 |
| 3 | 40 | 4 | −0.042 | −0.110 | 0.166 |
| 4 | 50 | 4 | −0.048 | −0.128 | 0.154 |
| 5 | 70 | 4 | −0.046 | −0.124 | 0.184 |
| 6 | 100 | 4 | −0.048 | −0.128 | 0.195 |
| 7 | 10 | 6 | −0.042 | −0.147 | 0.235 |
| 8 | 20 | 6 | −0.042 | −0.138 | 0.183 |
| 9 | 30 | 6 | −0.044 | −0 120 | 0.173 |
| 10 | 40 | 6 | −0.043 | −0.116 | 0.208 |
| 11 | 50 | 6 | −0.044 | −0.119 | 0.158 |
| 12 | 100 | 6 | −0.049 | −0.122 | 0.202 |
| 13 | 20 | 10 | −0.043 | −0.124 | 0.189 |
| 14 | 30 | 10 | −0.044 | −0.117 | 0.180 |
| 15 | 40 | 10 | −0.042 | −0.111 | 0.172 |
| 16 | 50 | 10 | −0.043 | −0.124 | 0.155 |
| 17 | 70 | 10 | −0.046 | −0.118 | 0.192 |
| 18 | 100 | 10 | −0.046 | −0.123 | 0.212 |

As it can be seen from the table, the electrode samples provided with a superficial coating based on nickel co-deposited with amorphous molybdenum oxides present two distinct Tafel slopes at low and high current density, evidencing the onset of different reaction mechanisms compared to those obtainable with the electrode of the prior art. Moreover, the catalytic activity at 0.1 A/cm² is sensibly enhanced, especially for coatings deposited at a current density centred around 50 mA/cm², which is evidenced as an optimum value. The influence of the Ni:Mo molar ratio appears conversely quite limited within the considered range. Cathode overvoltages obtainable with samples deposited within the current density range of 20 to 100 mA/cm² are similar to those expected for nickel cathodes with pigmented coatings based on nickel co-deposited with ruthenium dioxide at Ru loadings around 8-10 g/m², and about 30-50 mV higher than those expected for the same cathodes with pigmented coating of nickel and ruthenium dioxide at Ru loadings exceeding 15 g/m².

EXAMPLE 2

A series of electrodes identical to sample 4 of the preceding example were characterised as hydrogen-evolving cathodes in 33% NaOH at a temperature of 85° C. and subjected to an anodic polarisation lasting 1000 seconds at different potentials (V/SCE) to simulate a malfunctioning condition in a chlor-alkali plant. The results before and after the anodic polarisation in terms of Tafel slope and cathodic potential (V/SCE) at 0.2 A/cm² are reported in Table 2.

TABLE 2

| Applied anodic potential (t = 1000 s) | b1 (V/dec) | b2 (V/dec) | E (V/SCE) (j = 0.2 A/cm²) |
|---|---|---|---|
| n.n. | −0.036 | −0.108 | −1.28 |
| 0.30 V | −0.037 | −0.107 | −1.25 |
| 0.32 V | −0.034 | −0.109 | −1.25 |
| 0.34 V | −0.037 | −0.109 | −1.25 |
| 0.38 V | −0.032 | −0.112 | −1.25 |

The table allows to deduce that the cathode activity is not affected by the prolonged application of an anodic potential of the indicated order of magnitude.

EXAMPLE 3

A series of electrodes was prepared by simultaneous deposition of Ni and amorphous Mo oxide starting from a Watt bath analogous to that of Example 1, containing suspended submicronic particles of pre-reduced molybdenum oxide. The molybdenum oxide powder employed was obtained by subjecting the MoO3 powder obtained by thermal decomposition of (NH4)6Mo7O24.4H2O as per Example 1 to a reduction in hydrogen atmosphere at 623 K for one hour. The XRD spectrum of the thus treated powder displayed the characteristic peaks of some phases of partially reduced Mo (VI) oxide, among which H0.93MoO3 and H0.34MoO3 could be distinguished, and a peak of much lower intensity attributable to non reduced MoO3. The deposition was carried out at different current densities comprised between 20 and 100 mA/cm². The obtained electrodes characterised as hydrogen-evolving cathodes in a standard electrochemical cell with a 1 M NaOH-based catholyte at a temperature of 25° C. analogously as in Example 1; the results in terms of Tafel slopes and hydrogen overvoltages were approximately in line with those of similar samples obtained with powder of non-reduced MoO3.

Analogous results can be obtained by effecting the co-deposition starting from a suspension of preformed particles of mixed nickel and molybdenum oxides such as NiMoO4 in the galvanic bath, for instance obtainable by co-precipitation of the hydrated form from a nickel nitrate and ammonium heptamolybdate solution, and subsequent thermal decomposition at 550° C., or from a suspension of various mixtures of reduced, non-reduced or partially-reduced $MoO_3$ and other molybdenum mixed oxides according to different combinations, optionally obtained by thermal decomposition of different molybdenum precursor salts.

The previous description shall not be intended as limiting the invention, which may be used according to different embodiments without departing from the scope thereof, and whose extent is solely defined by the appended claims.

Throughout the description and claims of the present application, the term "comprise" and variations thereof such as "comprising" and "comprises" are not intended to exclude the presence of other elements or additives.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

What we claim is:

1. A method of manufacturing of an electrode for use as a cathode for hydrogen evolution in electrolytic processes comprising the following sequential steps:
  adding particles of at least one species selected from the group consisting of $MoO_3$, $NiMoO_4$ and $H_xMoO_3$ with x comprised between 0 and 1 to a galvanic bath containing nickel ions; and
  galvanically co-depositing nickel with at least one amorphous molybdenum oxide on a cathode substrate immersed in said galvanic bath at a current density of 20 to 100 mA/cm².

2. The method according to claim 1, wherein the $MoO_3$ particles are obtained by thermal decomposition of a precursor salt.

3. The method according to claim 2, wherein the precursor salt comprises an ammonium molybdate.

4. The method according to claim 3, wherein the ammonium molybdate is $(NH_4)_6Mo_7O_{24} \cdot 4H_2O$.

5. The method according to claim 1, wherein the galvanic bath is a Watts bath at pH 3 to 4 containing nickel sulphate, nickel chloride and boric acid.

6. The method according to claim 1, wherein the cathode substrate comprises nickel or copper.

7. An electrode suitable for use as a cathode for hydrogen evolution in electrolytic processes comprising a conductive substrate provided with a superficial coating based on nickel co-deposited with at least one amorphous molybdenum oxide formed by the method of claim 1.

8. The electrode according to claim 7, wherein the amorphous molybdenum oxide comprises at least one species selected from the group consisting of $MoO_3$, $NiMoO_4$ and a partially reduced Mo (VI) oxide expressed by the formula $H_xMoO_3$ with x comprised between 0 and 1.

9. The electrode according to claim 7, wherein said amorphous molybdenum oxide has a particle size of 10 to 50 nm.

10. The electrode according to claim 7, wherein a Ni:Mo molar ratio of said superficial coating is comprised between 4 and 10.

11. A cell for electrolysis processes with hydrogen cathodic evolution containing at least one electrode of claim 7 as a cathode.

* * * * *